United States Patent Office.

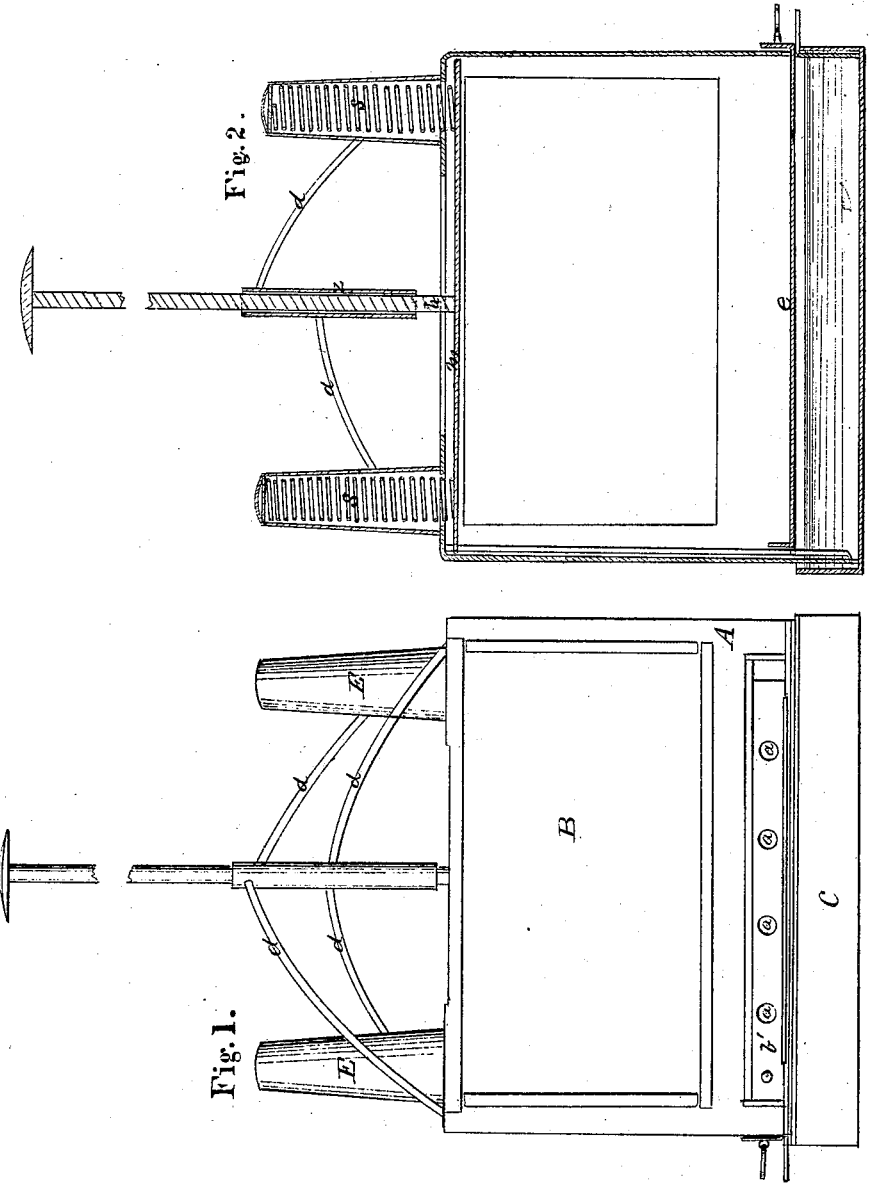

MICHAEL LITTLE, OF ASHLEY, ILLINOIS.

Letters Patent No. 98,984, dated January 18, 1870.

IMPROVEMENT IN FLY-TRAPS.

The Schedule referred to in these Letters Patent and making part of the same.

*To all whom it may concern:*

Be it known that I, MICHAEL LITTLE, of Ashley, in the county of Washington, and State of Illinois, have invented a new and valuable Improvement in Fly-Traps; and I do hereby declare that the following is a full, clear, and exact description of the construction and operation of the same, reference being had to the annexed drawings, making a part of this specification, and to the letters and figures of reference marked thereon.

Figure 1, of the drawings, is a front view of my invention.

Figure 2 is a central vertical longitudinal section of same.

My invention relates to means for catching and destroying flies, and consists, mainly, in the construction and novel arrangement of devices whereby flies are enticed into a trap, secured therein, and drowned.

The letter A, of the drawings, designates a rectangular box, fitted with small panes of glass, B, and having its bottom open.

It is placed in a water-box, c, which is easily removed for filling or cleaning.

a a are the openings through which the flies enter, being attracted by sugar or molasses spread upon the sliding shelf e.

A projecting ledge is formed on the outside of the box A, just below the openings a a, for the flies to alight on.

A perforated slide, b', is used, by which all the entrance-apertures on one side of the trap may be closed at the same time.

At the upper part of the trap, in the sectional view, fig. 2, is seen the descending shelf m, which is made to fit neatly the space between the walls of the trap, so that the flies cannot escape by passing around its edges.

It is upheld by the spiral springs s s, which are secured to the tops of the conical casings E E, fastened to the top of the box A.

Firmly secured to the centre of the shelf m is the lower end of the operating-rod h, which passes up through the sleeve z, and terminates in a convex head or knob.

The rod is held upright by the sleeve z, which is secured in position by the braces d d, attached to the four corners of the top of the box A.

The operation of the trap is as follows:

The slide b' having been arranged so that the entrance-apertures are open, the shelf e baited, and the water-box c filled, the trap is exposed to the flies, who will soon find their way through the apertures a a.

When the trap is sufficiently full, which is readily seen through the glass sides, the apertures a a are closed by pushing the slide b'. The baited shelf e is now withdrawn, and, by means of the rod h, the shelf m is driven down into the water of the water-box.

What I claim as my invention, and desire to secure by Letters Patent, is—

The fly-trap herein described, having glass sides, B, descending shelf m, with springs s, and operating-rod h, removable feed-shelf e, and water-box c.

In testimony that I claim the above, I have hereunto subscribed my name, in the presence of two witnesses.

MICHAEL LITTLE.

Witnesses:
 NAPOLEON BOLLING,
 A. J. FANES.